United States Patent
Gardner et al.

(10) Patent No.: US 7,051,238 B2
(45) Date of Patent: May 23, 2006

(54) METHOD AND SYSTEM FOR USING MACHINE-ARCHITECTURE SUPPORT TO DISTINGUISH FUNCTION AND ROUTINE RETURN VALUES

(75) Inventors: Robert D. Gardner, Fort Collins, CO (US); Bret A. McKee, Fort Collins, CO (US); Chris D. Hyser, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 493 days.

(21) Appl. No.: 10/209,101

(22) Filed: Jul. 30, 2002

(65) Prior Publication Data
US 2004/0025080 A1 Feb. 5, 2004

(51) Int. Cl.
*G06F 11/00* (2006.01)

(52) U.S. Cl. .................. 714/38; 714/49; 714/765; 712/244

(58) Field of Classification Search .................. 713/52, 713/37, 38, 765
See application file for complete search history.

(56) References Cited

U.S. PATENT DOCUMENTS

| | | | | |
|---|---|---|---|---|
| 5,692,169 A | * | 11/1997 | Kathail et al. | 712/244 |
| 5,748,936 A | * | 5/1998 | Karp et al. | 712/218 |
| 5,881,280 A | * | 3/1999 | Gupta et al. | 712/244 |
| 5,915,117 A | * | 6/1999 | Ross et al. | 710/262 |
| 6,301,705 B1 | * | 10/2001 | Doshi et al. | 717/154 |
| 6,314,513 B1 | * | 11/2001 | Ross et al. | 712/228 |
| 6,378,087 B1 | * | 4/2002 | Flanagan et al. | 714/38 |
| 6,463,579 B1 | * | 10/2002 | McKinsey | 717/146 |
| 6,640,315 B1 | * | 10/2003 | Hwu et al. | 714/17 |
| 6,665,824 B1 | * | 12/2003 | Ruhlen et al. | 714/57 |
| 6,895,527 B1 | * | 5/2005 | Quach et al. | 714/5 |

\* cited by examiner

*Primary Examiner*—Bryce P. Bonzo
*Assistant Examiner*—Philip Guyton
(74) *Attorney, Agent, or Firm*—Richard P. Lange

(57) ABSTRACT

A method and system for nearly immediately trapping a failure-to-check-a-return-value error in a computer program. Modern processor architectures, such as the Intel® IA-64 processor architecture, provide for control speculation of load instructions, including 1-bit NAT registers, associated with general registers, that indicate occurrences of deferred exceptions arising during execution of control-speculative load instructions targeting the corresponding general registers. One embodiment of the present invention employs the NAT registers associated with general-purpose registers to distinguish special values, often indicating error conditions, stored in general-purpose registers serving to store the return values of functions and routines.

17 Claims, 4 Drawing Sheets

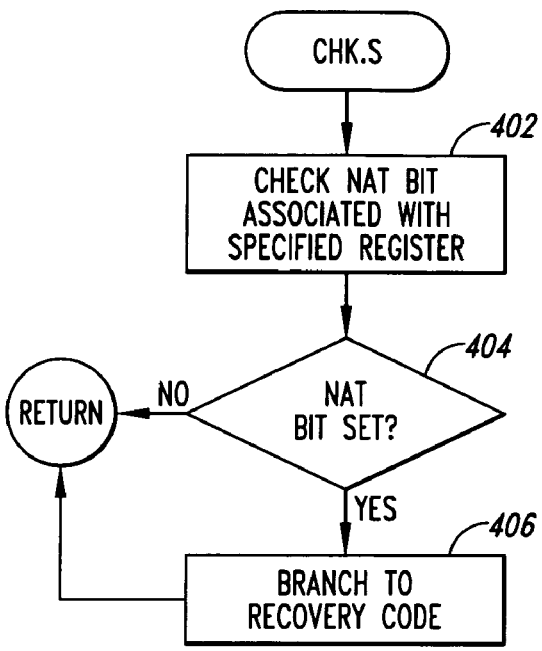

Fig. 4

```
class candidate
{
        private:
                char name[MAX_NAME];
                int candidateNo;
                char bio[MAX_BIO];
                int numVotes;

public:
                bool in(const char* c) {return strstr(name,c) !=NULL;};
                char* getName() {return (nameLen>0) ? name : NULL;};
                void setName(const char*nm) (strcpy(name, nm); nameLen =
                        strlen(name);};
                Int getNo() {return candidateNo;};
                void setNo(int n) {candidateNo = n;};
                char* getBio() {return bio;};
                void setBio(const char*b) {strcpy(bio,b);};
                int getVotes() {return numVotes;};
                void incVotes() {numVotes++;};
                candidate();
                ~candidate();
};
```

Fig. 5A

```
class candidate
{
        private:
                char name[MAX_NAME];
                int nameLen;
                int candidateNo;
                char bio[MAX_BIO];
                int numVotes;

public:
                bool in(const char* c) {return strstr(name,c) !=NULL;};
                char* getName();
                void setName(const char*nm) {strcpy(name, nm); nameLen =
                        strlen(name);};
                Int getNo() {return candidateNo;};
                void setNo(int n) {candidateNo = n;};
                char* getBio() {return bio;};
                void setBio(const char*b) {strcpy(bio,b);};
                int getVotes() {return numVotes;};
                void incVotes() {numVotes++;};
                candidate();
                ~candidate();
};

char*candidate::getName()
{
        if (nameLen > 0) return name;
        else
        {
                char*retVal = NULL;
                _asm
                {
                        load.s retVal, [0]
                }
                return retVal:
        }
}
```

*Fig. 5B*

METHOD AND SYSTEM FOR USING MACHINE-ARCHITECTURE SUPPORT TO DISTINGUISH FUNCTION AND ROUTINE RETURN VALUES

TECHNICAL FIELD

The present invention relates to software programming techniques and, in particular, to a method and system for using machine-architecture support for control speculation of load instructions to provide machine-level support for detecting improper uses of distinguished values returned by software functions.

BACKGROUND OF THE INVENTION

The present invention is related to software programming techniques. In many source-level programming languages, discrete portions of a software program are written as routines or functions that each return one or more return values. Software-program functions are somewhat related to the concept of a "function" in mathematics, mapping one or more input values, or domain variables, to one or more return variables. Often, various error conditions, or special conditions that cannot be easily handled, arise during execution of a function. It is a common software programming technique to export the fact that an error condition or other anomaly has arisen by returning a special return value, or distinguished value, to a calling routine. For example, many standard C-language and C++-language routines return pointers, essentially memory addresses, to various data and objects, and, in the case of the occurrence of an error condition, return a special value "NULL," often encoded as the integer value "0," that can never be the value of a valid pointer. In such cases, the return value must be checked by the calling routine for being equal to NULL prior to its use. In the case of a NULL pointer, for example, an attempt to dereference the pointer causes a fault condition at the machine-instruction level, since the virtual-memory address "0" is generally not accessible to source-level routines. The fault condition generally results in termination of the routine, and, in certain cases, may result in more serious conditions, such as operating-system crashes, data corruption, and other undesirable phenomena.

Failure to check a return value for NULL, or another distinguished value indicating an error condition, is a common programming error. When this programming error occurs in an application program directly following return of the function or routine that returns an error condition encoded in a distinguished value, an annoying, but easily debugged, application-program halt may occur. More serious problems, however, may occur in operating-system programs, or in any program in which the unchecked return value is not immediately used, but, instead, passed on to other routines or statements that may reside many instructions away from the function call. In operating systems, a premature program halt may not be easily debugged, because the halt may bring the entire computer system to a halt, without preserving the data needed to determine where, in the operating system code, the halt occurred. When unchecked return values are passed through various additional routines and statements, it may be quite difficult to backtrack through hundreds, thousands, or tens of thousands of machine instructions or source-level statements to identify the point where the return value was not checked. Additionally, it often occurs that a return value is initially checked at one pointer after return of a routine, but later, the return is inadvertently accessed inappropriately despite the initial check. Such errors can be especially difficult to track down, because it appears that the return value was properly handled. Finally, many commonly used routines almost never return an error value, but are used many times throughout a large program. Memory allocation routines, such as malloc in C programming environments, represent one example of often called, but seldom failing routines. For such routines, return value checking can represent significant instruction execution overhead that is almost never necessary. Software programmers, computer designers and manufacturers, and, especially, operating system developers have therefore recognized a need for early detection and trapping of failure-to-check-a-return-value errors in programs, detection and trapping of errors resulting in use or access of a return value in a particular way, despite an initial check that indicated that the return value should not be used or accessed in that way, and a need for avoiding unnecessary error checking of return values.

SUMMARY OF THE INVENTION

One embodiment of the present invention provides a method and system for automated, nearly immediate trapping of a failure-to-check-a-return-value error in a computer program that employs machine-architecture support and machine-level detection of such errors. This embodiment also traps inadvertent and inappropriate use or access of a return value despite an initial error check that indicates that the error value should not be so used or accessed. In addition, this embodiment can be employed to avoid explicit checking of return values for error conditions.

BRIEF DESCRIPTION OF THE DRAWINGS

FIG. 4 is a flow control diagram for execution of a chk.s instruction following a speculated load instruction.

FIG. 5A shows the modified declaration for the class "candidate" and the modified, but conventional, implementation of the function member "getName."

FIG. 5B shows a final declaration of the class "candidate" and a final implementation of the function member "getName" incorporating one embodiment of the present invention.

DETAILED DESCRIPTION OF THE INVENTION

Figure 1:
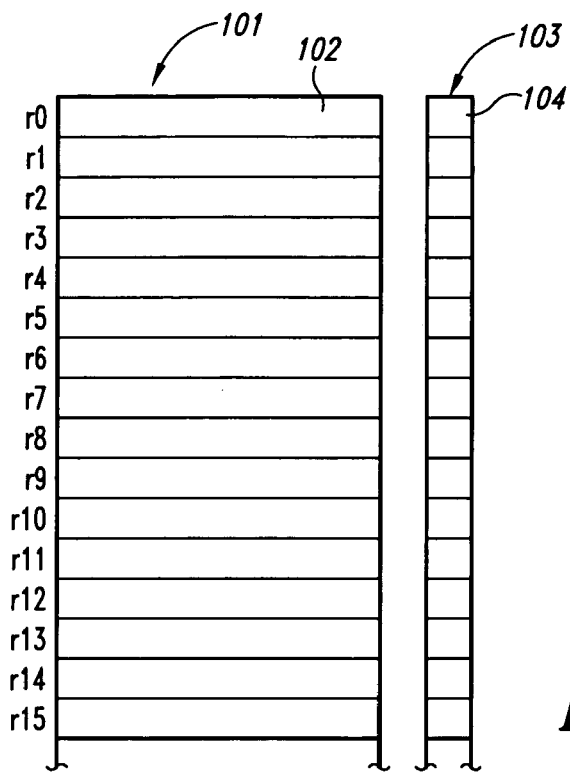
FIG. 1 illustrates a portion of the general 64-bit integer registers of the IA-64 processor.

One embodiment of the present invention provides a means for machine-level detection of software-program errors resulting from a failure to check a return value for one or more distinguished values before attempting to subsequently use the returned value. Modern processor architectures, such as the Intel® IA-64 processor architecture, provide for control speculation of load instructions. Control speculation of load instructions allows a load instruction to relocated, for optimization purposes, above a conditional branch instruction that, in corresponding, original, non-optimized code, controls whether or not the load instruction is executed. A check instruction is placed in the same position, relative to the conditional branch instruction, that is occupied by the load instruction in the non-optimized code. The processor may defer certain exceptions that arise during execution of the relocated, control-speculative load instruction. To defer an exception, the processor sets a 1-bit register, or bit within a register, referred to as a not-a-thing ("NAT") bit, associated with the register target of the control-speculative load instruction, to the value "1" to indicate the occurrence of the deferred exception. The exception is deferred until the check instruction, or another non-speculative instruction that accesses the target register of the load instruction, checks the associated NAT bit to determine whether an exception related to the target register of the check instruction or another non-speculative instruction was deferred. The value of the NAT bit associated with the control-speculative-load-instruction target register is automatically propagated to the NAT bits associated with other general-purpose registers that receive the contents of the control-speculative-load-instruction target register until the exception is handled, or a valid data value is subsequently stored in the control-speculative-load-instruction target register. An attempt by a non-speculative instruction to access the value stored in a general-purpose register associated with a NAT bit having the value "1" results in raising of a machine exception.

One embodiment of the present invention employs the NAT bits associated with general-purpose registers to flag distinguished values stored in general-purpose registers serving to store the return values of functions and routines. By using NAT bits to flag error return values, the described embodiment of the present invention insures that failures to check distinguished return values, such as NULL pointers, are detected nearly immediately after the failure to check the return value, and not further along in a program, where debugging can be quite difficult. Inadvertent and inappropriate use of, or access to, a return value can also be detected. Furthermore, by setting up a NAT exception handler, an operating system can insure that a failure-to-check-a-return-value error can be handled at run-time, without halting the operating system and destroying the state of the machine needed to identify where the failure-to-check-a-return-value error occurred in the code. Finally, the NAT bits can be used to avoid explicit return value checks, allowing a program to rely instead on error handling routines for exceptional cases.

Machine-architecture support for control speculation of load instructions, used in one embodiment of the present invention for machine-level detection of software programming errors, and an embodiment of the present invention, are best described with respect to a very short, C++-like pseudocode implementation of two classes, presented below, along with a short pseudo-assembly-language version of a for-loop extracted from a function member of one of the two classes. In a first subsection, the C++-like pseudocode implementation of the two classes is presented. In a second subsection, control speculation is described with reference to the short pseudo-assembly-language version of a for-loop extracted from a function member of one of the two classes. In a third subsection, the C++-like pseudocode is modified to add functionality, but with a common software bug that results in program termination. Finally, in a fourth subsection, one embodiment of the present invention is employed to address the problem described in the third subsection.

C++-Like Pseudocode Implementation of the Two Classes

The C++-like pseudocode implements a class "candidate" and a class "election." An instance of the class "candidate" represents a candidate running in an election, and an instance of the class "election" represents an election in which votes for candidates are polled and a winner determined. This simple C++-like pseudocode is provided only as an illustrative context for discussion of an pseudo-assembly-language version of a portion of the function member "winner" of the class "election," and for discussion of one embodiment of the present invention.

First, the C++-like pseudocode begins with an include directive and three constant declarations:

```
1 #include <string.h>
2 const int MAX_NAME = 100;
3 const int MAX_BIO = 4096;
4 const int MAX_CANDIDATES = 100
```

Next, the C++-like pseudocode includes several class declarations:

```
1 class candidate
2 {
3     private:
4         char name[MAX_NAME];
5         int candidateNo;
6         char bio[MAX_BIO];
7         int numVotes;
8     public:
9         bool in(const char* c) {return strstr(name, c) != NULL;};
10        char* getName() {return name;};
11        void setName(const char* nm) {strcpy(name, nm);};
12        int getNo() {return candidateNo;};
13        void setNo(int n) {candidateNo = n;};
14        char* getBio() {return bio;};
15        void setBio(const char* b) {strcpy(bio, b);};
16        int getVotes() {return numVotes;};
17        void incVotes() {numVotes++;};
18        candidate();
19        ~candidate();
20 };
```

An instance of the class "candidate" includes data members, declared above on lines 4–7, that store the name of, and identification number for, biographical information for, and the number of votes for a particular candidate. The class "candidate" includes function members, declared above on lines 9–17, for storing and retrieving values to and from the data members.

Next, a declaration for the class "election" is provided:

```
1 class election
2 {
3     private:
4         candidate candidates[MAX_CANDIDATES];
```

```
5    int num;
6 public:
7    void addCandidate(const char* c, int n, const char* bio);
8    candidate* getCandidate(int cNo) {return
9         (cNo <= num && cNo >= 0)? &(candidates[cNo – 1]): NULL;};
10   void vote (const char* c);
11   int winner();
12   election();
13   ~election();
14 };
```

An instance of the class "election" includes two data members, declared above on lines 4–5. The array "candidates" contains a number of instances of the class "candidate" and "num" contains the number of instances of the class "candidates" stored in the data-array member "candidates." The class "election" includes function members, declared above on lines 7–13, that include functions to add a candidate to the election, to get a pointer to a particular candidate, to vote for a candidate, and to select the winner of an election.

Implementations for non-line function members for the classes "candidate" and "election" are provided below:

```
1 candidate::candidate()
2 {
3    strcpy(name, "");
4    numVotes = 0;
5 }
1 void election::addCandidate(const char* c, int n, const char* b)
2 {
3    candidates[num].setName(c);
4    candidates[num].setBio(b);
5    candidates[num].setNo(n);
6    num++;
7 }
1 void election::vote(const char* c)
2 {
3    int i;
4    for (i = 0; i < num; i++)
5    {
6         if (candidates[i].in(c)) candidates[i].incVotes();
7    }
8 }
1 int election::winner()
2 {
3    int i, maxVotes = 0;
```

```
4    int res = –1;
5    for(i = 0; i < num; i++)
6    {
7         if (candidates[i].getVotes() > maxVotes)
8         {
9              res = candidates[i].getNo();
10             maxVotes = candidates[i].getVotes();
11        }
12   }
13   return res;
14 }
```

The function member "winner" iterates through all instances of the class "candidate" and data-array member "candidates" in the for-loop of lines 5–12 searching for the instance of class "candidate" that contains the largest number of votes.

The following discussion focuses on an exemplary for-loop from the function member "winner" of the class "election," discussed above:

```
5    for (i = 0; i < num; i++)
6    {
7         if (candidates[i].getVotes() > maxVotes)
8         {
9              res = candidates[i].getNo();
10             maxVotes = candidates[i].getVotes();
11        }
12   }
```

A possible pseudo-assembly-language version of this for-loop is provided below:

```
// r1 = this
// r2 = offset to num
// r3 = offset to candidates
// r4 = sizeof(candidate)
// r5 = offset to candidateNo
// r6 = offset to numVotes
// r7 = maxVotes
// r8 = i
// r9 = res
1              mov r8 = 0                  // i = 0
2              add r10 = r1, r2
3              ld8 r11 = [r10]             // r11 = num
4              add r12 = r1, r3            // r12 = &(candidates[0])
5 LOOP:        cmp.lt p0, p1 = r8, r11     // i < num
6              (p1) br.cond ENDLOOP        // if (i >= num) terminate loop
7              add r13 = r12, r6
8              ld8 r14 = [r13]             // r14 = candidates[i].numVotes
9              cmp.gt p2, p3 = r14, r7     // candidates[i].numVotes > maxVotes
10             (p3) br.cond CONTIN         // if (candidates[i].numVotes <=
```

-continued

```
11            add r15 = r12, r5     //        maxVotes) continue
12            ld8 r9 = [r15]         // res = candidates[i].candidateNo
13            mov r7 = r14           // maxVotes = candidates[i].numVotes
14 CONTIN:    add r8 = 1, r8         // i = i + 1
15            add r12 = r12, r4      // r12 = &(candidates[l])
16            br LOOP
17 ENDLOOP:
```

In the commented lines at the beginning of the above pseudo-assembly-language code, definitions for registers "r1"–"r9" are provided in terms of data members and local variables of the corresponding C++-like pseudocode, described above. The numbered lines contain assembly language instructions for carrying out the for-loop, and are commented to indicate their correspondence to C++-like code.

Consider the load instruction on line 12 of the above pseudo-assembly-language extract. A load instruction generally requires a larger number of processor cycles, and a greater degree of execution latency involved in cache accesses through a processor bus, than register-to-register instructions, such as the move instruction on line 13. Optimizing compilers seek to move load instructions upward, in the execution sequence, so that they can execute in parallel with register-to-register instructions, and complete prior to the need for the value accessed by the load instruction. For example, lines 11 and 12 could be moved, by an optimizing compiler, upward, directly after line 8, as follows:

used. Otherwise, had the load instruction not been executed in the non-optimized code because of the controlling conditional branch, an exception arises during execution of the relocated load instruction that would not have arisen had the assembly code not been optimized by moving the load instruction upward. The optimized program may fail, with a fault condition, in a case in which the non-optimized program would have executed correctly to completion. For example, consider the conditional branch instruction in the first version of the assembly code, on line 10, directly above computation of the memory address of the data member "candidateNo" on line 11 and the load instruction that fetches the contents of the computed memory address, on line 12. In many cases, when the currently considered candidate does not have a number of votes greater than the value in max Votes, the instructions immediately following the conditional branch on line 10 are not executed. Consider, by contrast, the second assembly code version, in which the load instruction originally on line 12 has been relocated above the conditional branch originally on line 10. In the

```
1             mov r8 = 0                     // i = 0
2             add r10 = r1, r2
3             ld8 r11 = [r10]                // r11 = num
4             add r12 = r1, r3               // r12 = &(candidates[0])
5 LOOP:       cmp.lt p0, p1 = r8, r11        // i < num
6             (p1) br.cond ENDLOOP           // if (i >= num) terminate loop
7             add r13 = r12, r6
8             ld8 r14 = [r13]                // r14 = candidates[i].numVotes
9             add r15 = r12, r5              //        maxVotes) continue
10            ld8 r9 = [r15]                 // res = candidates[i].candidateNo
11            cmp.gt p2, p3 = r14, r7        // candidates[i].numVotes > maxVotes
12            (p3) br.cond CONTIN            // if (candidates[i].numVotes <=
13            mov r7 = r14                   // maxVotes = candidates[i].numVotes
14 CONTIN:    add r8 = 1, r8                 // i = i + 1
15            add r12 = r12, r4              // r12 = &(candidates[l])
16            br LOOP
17 ENDLOOP:
```

The load is launched, in the second version of the assembly code, above, prior to the need for the results of the load instruction. Because modern processors, such as processors conforming to the Intel® IA-64 processor architecture, referred to below as "the IA-64 processor," pipeline instructions and because these modern processors employ non-blocking caches, the load instruction executes in parallel with subsequent instructions. In the current case, the results of the load instruction are needed only following termination of the loop and return from the function member "winner."

However, should an exception arise during execution of the load instruction, the run-time system needs to defer the exception until the results of the load instruction are actually optimized assembly code, the load instruction is executed during each iteration of the loop, rather than only when a currently considered candidate has a greater number of votes than the value stored in maxVal. If an exception occurs during execution of the load instruction in a loop iteration in which, in the non-optimized code, the load instruction would not have been executed, then the optimized assembly code may fail in a case in which the non-optimized assembly code would not have failed.

The above-described problem is solved, in modern processors, such as the Intel IA-64 processor family, by providing for control speculation of load instructions. The following pseudo-assembly-language code includes a control-speculative version of the load instruction, originally on line 15, but relocated upward to line 13:

```
1              mov r8 = 0                   // i = 0
2              add r10 = r1, r2
3              ld8 r11 = [r10]              // r11 = num
4              add r12 = r1, r3             // r12 = &(candidates[0])
5  LOOP:       cmp.lt p0, p1 = r8, r11      // i < num
6              (p1) br.cond ENDLOOP         // if (i >= num) terminate loop
7              add r13 = r12, r6
8              ld8 r14 = [r13]              // r14 = candidates[i].numVotes
9              add r15 = r12, r5            //        maxVotes) continue
10             ld8.s r9 = [r15]             // res = candidates[i].candidateNo
11             cmp.gt p2, p3 = r14, r7      // candidates[i].numVotes > maxVotes
12             (p3) br.cond CONTIN          // if (candidates[i].numVotes <=
13             mov r7 = r14                 // maxVotes = candidates[i].numVotes
14             chk.s r9, RECVR
15 CONTIN:     add r8 = 1, r8               // i = i + 1
16             add r12 = r12, r4            // r12 = &(candidates[l])
17             br LOOP
18 RECVR:      ld8.s r9 = [r15]
19             br CONTIN
20 ENDLOOP:
```

Note that the two instructions that originally resided on lines 11 and 12 are relocated upward to lines 9 and 10. Thus, the add instruction that computes the address of the data member "candidateNo," and the subsequent load instruction that loads the value of candidateNo from memory into register "r9," have now been moved above the conditional branch instruction, originally on line 10 and now on line 12, that, in the non-optimized pseudo-assembly-language extract, controls whether or not the two instructions are executed. By moving the two instructions upward, the long-latency load instruction can be executed in parallel with the subsequent compare and branch instructions so that, when the result is needed, the value will have already been successfully fetched from memory. A new instruction, "chk.s," now occupies line 14 in the same place originally occupied by the two relocated instruction with respect to the conditional branch instruction now on line 12, and the load instruction that was moved upward has now become a "ld8.s" instruction. The ".s" suffix indicates a control-speculated load, for which the processor defers certain exceptions that occur during execution of the load instruction until the register containing the result of the load instruction is subsequently used in a non-speculative instruction or specified as an argument to a chks instruction. The chks instruction on line 14 checks to see if the previously executed load instruction, on line 10, successfully completed, without exceptions. If no exceptions occurred, then the processor continues by executing the next instruction following the chk.s instruction. However, if an exception did occur during previous execution of the load instruction on line 10, then a branch is taken to the instruction labeled with the label "RECVR," on line 18. The label "RECVR" labels a recovery block, in which the load instruction is reissued prior to branching back to the statement labeled with the label "CONTIN."

Control speculation is made possible in the IA-64 processor by the addition of various registers and register fields within the register set as well as by control-speculation logic included in the processor. FIG. 1 illustrates a portion of the general 64-bit integer registers of the IA-64 processor. In FIG. 1, the 64-bit general-purpose integer registers "r0," ""r1," . . . are shown in a column of registers 101 labeled with the register names. Each general-purpose, 64-bit integer register, such as register "r0"102, is associated with a special, 1-bit attribute. These special, 1-bit attributes are shown in a column of 1-bit registers 103 in FIG. 1 aligned with the general-purpose registers 101. Thus, for example, the first special 1-bit attribute 104 is associated with general-purpose register "r0"102. The special 1-bit registers are referred to as "NAT" bits, standing for "not-a-thing" bits. The NAT bits may be implemented as a set of 1-bit registers, or may be implemented using reserved values or bits within general registers. The NAT bit associated with a general-purpose register has the value "1" after an exception has been deferred during loading of the register via a speculative load instruction, and otherwise has the value "0." NAT bits also may propagate to another register, when the contents of, or value derived from the contents of, a register with a NAT bit having the value "1" is stored in the register.

Figure 2:
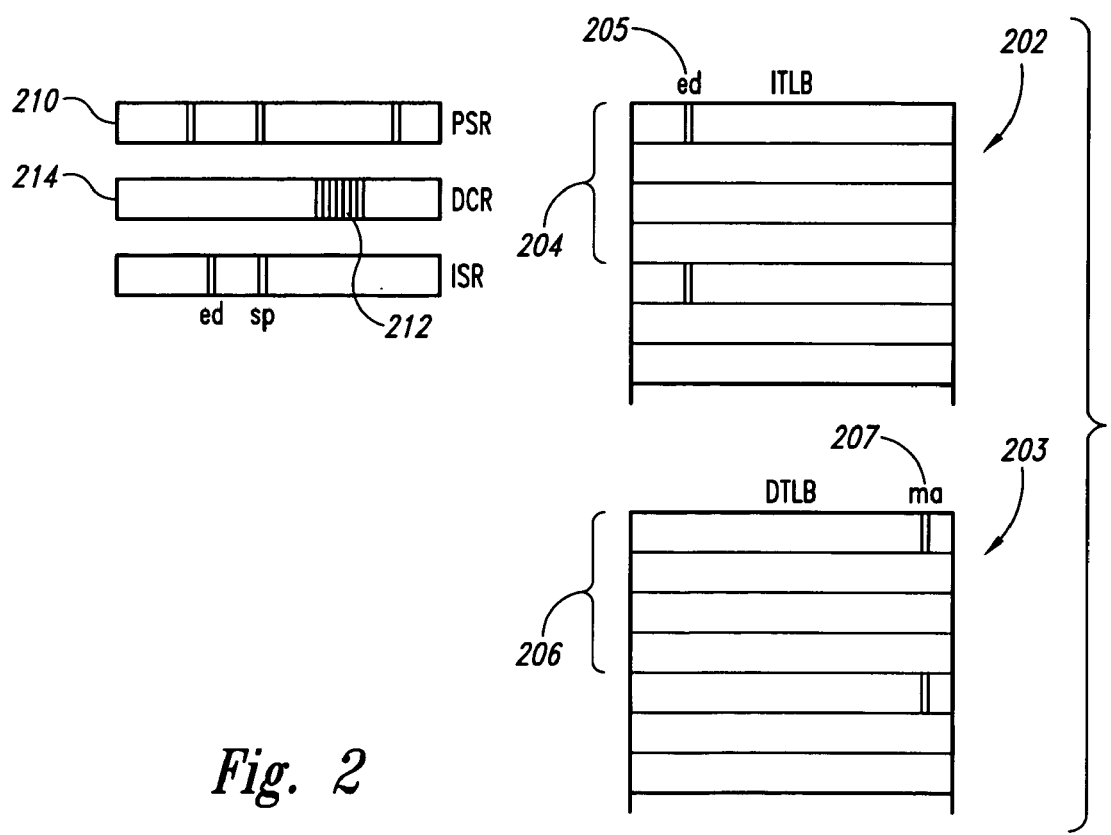
FIG. 2 illustrates the system registers involved in configuring control speculation within the IA-64 processor.

Control speculation is configurable via fields within various system registers. FIG. 2 illustrates the system registers involved in configuring control speculation within the IA-64 processor. The IA-64 processor employs two translation caches that store virtual-memory-to-physical-memory translations for virtual-memory addresses. The first translation cache 202 is the instruction translation look aside buffer ("ITLB") which stores virtual-memory-to-physical-memory translations for the virtual-memory addresses of instructions, and includes a data translation look aside buffer ("DTLB") 203 for storing virtual-memory-to-physical-memory translations for virtual-memory addresses of data within memory. In an ITLB entry, such as ITLB entry 204, a bit field 205, referred to as "ITLB.ed," indicates whether or not there is recovery code for speculated instructions. If the field "ITLB.ed" has a value "1," then recovery code for deferred exceptions that arise during execution of speculative load instructions have been inserted in the code. Similarly, a DTLB entry, such as DTLB entry 206, which represents the translation of a virtual-memory data address, includes a field "DTLB.ma" 207 that indicates the speculative, cacheability, and write-policy characteristics of the corresponding virtually mapped page. The field "DTLB.ma" may be used by the processor to determine whether or not exceptions should or should not be deferred. For example, the virtual memory may map to an I/O device, for which access may involve side effects, and for which failed operations should not be retried. The processor status register ("PSR") 210 includes three bit fields that control whether or not the processor defers certain exceptions that arise during execution of a control-speculative load instruction. When the bit field "PSR.ic" has the value 0, all exceptions arising during control-speculative load execution are deferred, a mode of processing useful for operating-system routines in which immediate handling of exceptions is inconvenient. The bit field "PSR.it" indicates whether or not 64-bit instruction addresses are virtual or physical. When this bit field has the value "0," the processor will not eagerly defer exceptions from speculative load instructions. Finally, when the bit field "PSR.ed" has the value "0," exception deferral is forced on restarted control-speculative loads. The operating system can control, to a certain extent, the types of exceptions that can be deferred during control speculation. When the values of PSR.ic, PSR.it, and ITLB.ed are all equal to 1 during execution of a load instruction, then whether or not an exception of a particular exception type that arises is deferred is determined by whether or not a bit within a range of bits 212 within the DCR register 214 corresponding to the particular exception type is set. Thus, an operating system may designate certain types of exceptions for deferral, while other types of exceptions are not deferred, but are instead immediately handled.

The details of the exact behavior of the IA-64 processor in response to the values in the various bit fields described above are beyond the scope of the discussion necessary to provide background for the present invention. Those details are available in the Intel IA-64 Architecture Software Developers Manuals, Volumes 1–4, published by Intel. However, it is important to note that the NAT bits associated with general-purpose registers, as well as similar encodings associated with floating-point registers, flag the occurrence of exceptions during speculated load execution, that processor behavior with respect to execution of speculated load instructions is configurable, via certain system registers, and that certain exceptions that may arise during execution of the speculated load instruction may be configured, via the DCR register, to be deferred or to be immediately raised. It should also be noted that NAT bits propagate to registers to which the contents of a register associated with a set NAT bit are moved, or to which results derived from a value stored in register associated with a set NAT bit are stored. Propagation of NAT bits insures that invalid register contents resulting from deferred speculative loads are not used as a result of transferring the invalid register contents to another register.

Figure 3:
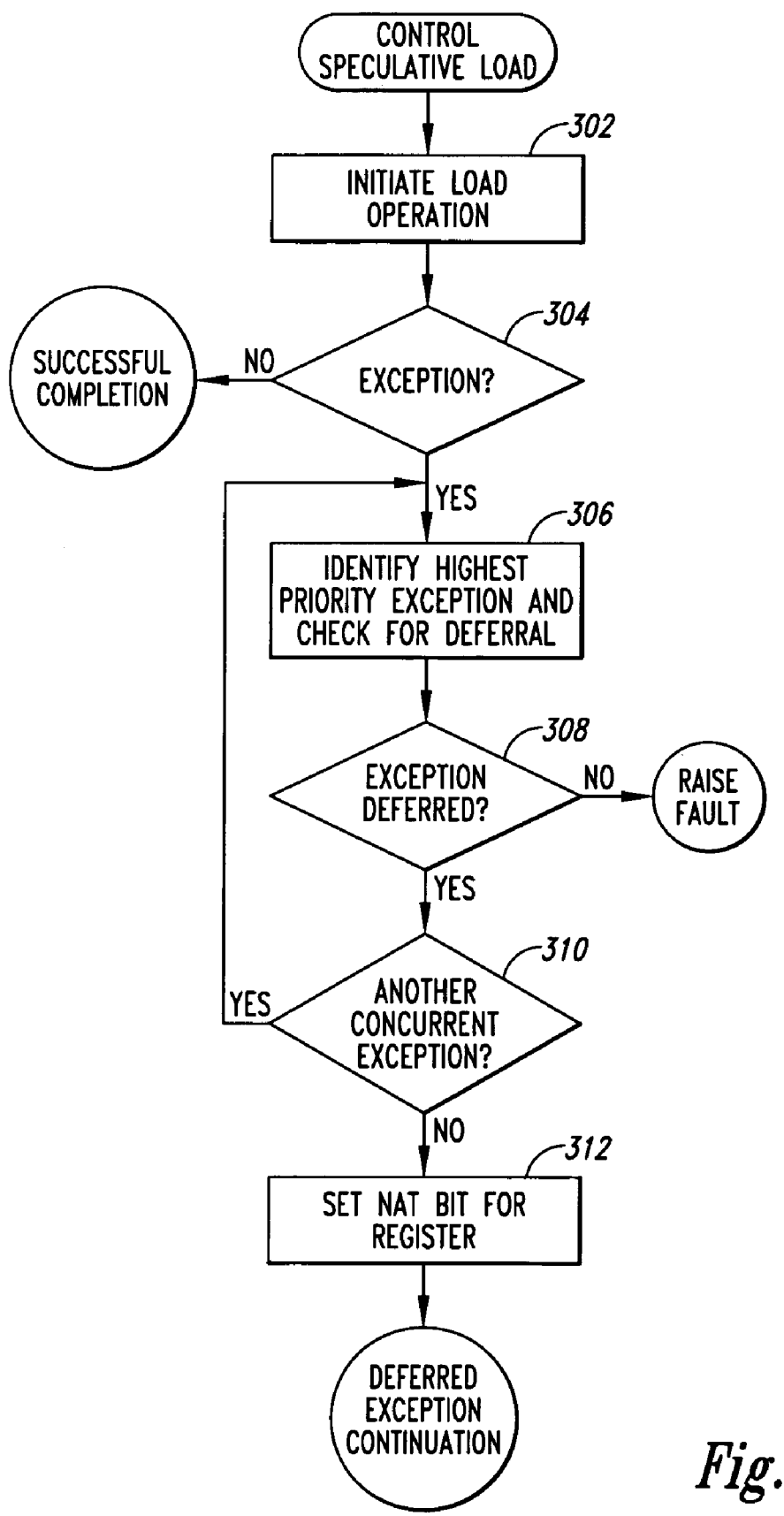
FIG. 3 is a flow-control diagram that represents processing of a control-speculated load instruction.

FIG. 3 is a flow-control diagram that represents processing of a control-speculated load instruction. In step 302, the processor initiates the load operation. In step 304, the processor determines whether or not an exception condition has occurred during processing of the load operation. If an exception condition has not occurred, then control speculative load processing finishes with a successful completion. Otherwise, in step 306, the processor identifies the highest priority exception among the one or more exceptions that may have occurred and checks the status registers to determine whether or not that exception should be deferred. If, as determined in step 308, the exception is not deferrable under the current configuration stored within system registers, then a fault is immediately raised. Otherwise, in step 310, the processor determines whether additional exceptions have yet to be considered. If so, then control flows back to step 306. Otherwise, the NAT bit associated with the target register of the load instruction is set to the value "1," in step 312, and execution of the load instruction terminates with a deferred exception condition.

FIG. 4 is a flow control diagram for execution of a chk.s instruction following a control-speculative load instruction. In step 402, the processor checks the NAT bit associated with the register specified in the chk.s instruction to determine whether or not the NAT bit is set, indicating occurrence of an exception during prior execution of a load instruction directed to the specified register. If the NAT bit is set, as detected in step 404, then the processor branches to the recovery code specified in the chk.s instruction in step 406. Otherwise, execution of the chk.s instruction is complete.

C++-Like Pseudocode Modification

As is usual in software development, a later developer may decide to modify the above-described classes "candidate" and "election" in order to add functionality. In the following, changes that represent one such attempt to modify the classes are described, largely without again describing those portions of the class implementations that are not modified. First, the class "candidates" is modified to include a new data member "nameLen" that either contains the number of characters in the data member "name," or that contains the value "0," in the case that no candidate name is currently contained in data member "name," and the function member "getName" is modified to return a NULL pointer, in the case that no candidate name is currently contained in data member "name:"

```
1  class candidate
2  {
3      private:
4          char name[MAX_NAME];
5          int nameLen;
6          int candidateNo;
7          char bio[MAX_BIO];
8          int numVotes;
9
10     public:
11         bool in(const char* c) {return strstr(name, c) != NULL;};
12         char* getName() {return (nameLen > 0) ? name : NULL;};
13         void setName(const char* nm)
14             {strcpy(name, nm); nameLen = strlen(name);};
```

Note that the entire declaration for the class candidate is not provided, nor is the entire declaration of the class "election" be provided below, but only enough of the declaration to show the modifications that have been made to the original class declaration:

```
class election
{
    private:
        candidate candidates[MAX_CANDIDATES];
        int num;
        int candidateNames(char** names);
    public:
        void addCandidate(const char* c, int n, const char* bio);
        candidate* getCandidate(int cNo) {return (cNo <= num && cNo >= 0)
            ? &(candidates[cNo - 1]): NULL;};
        void vote (const char* c);
        int winner();
        void printNames();
```

Two new function members have been added to the class "election:" (1) private function member "candidateNames," which places pointers to the names of candidates, stored in instances of the class "candidate" within the data array "candidates," into an array of pointers supplied as an argument, returning the number of names processed; and (2) "printNames," which prints out the names of the candidates in alphabetic order. Implementations for these new member functions, as well as a compare function used by a call to a quicksort routine, follow:

```
1 int compare(const void *a1 const void *a2)
2 {
3    return (_stricmp(*(char**) a1, *(char**) a2));
4 }
1 int election::candidateNames(char** names)
2 {
3    int i;
4    for (i = 0; i < MAX_CANDIDATES; i++)
5    {
6        names[i] = candidates[i].getName();
7    }
8    return i;
9 }
1 void election::printNames()
2 {
3    char* nms[MAX_CANDIDATES];
4    int i,j;
5    j = candidateNames(&(nms[0]));
6    qsort( (void )&(nms[0]), j, sizeof(char), compare);
7    printf("\n Candidate Names: \n");
8    for (i = 0; i < j; i++)
9    {
10       printf(" %s\n", nms[i]);
11   }
12   printf("\n");
13 }
```

The function "compare" simply calls the function "_stricmp" to lexically compare two strings. The function member "candidateNames" iterates through the data-array member "candidates," placing a pointer to each candidate name into the array of pointers supplied as argument "names." Unfortunately, the programmer has erroneously programmed the for-loop to iterate through the entire data-array "candidates," using the constant "MAX_CANDI-DATES" in the test portion of the for-loop statement, rather than data member "num." As a result, for any election having less than MAX_CANDIDATES candidates, one or more NULL pointers are returned by function member "getName" of class "candidate," on line 6 of function member "candidateNames," which are inserted by candidateNames into the array of pointers "names." The programmer has made a second, and more serious error, by not checking the return value from the call to candidateNames for a returned NULL pointer. The function member "printNames" calls function member "candidateNames," on line 5, to place pointers to the names of the candidates into local array "nms," calls qsort, on line 6, to alphabetically sort the names, and then, in the for-loop of lines 8–11, prints out the names of candidates in alphabetical order.

Unfortunately, when the function member "printNames" is called for an instance of the class "election" with fewer than 100 candidates, the program containing the instance of the class "election" prematurely terminates with an unrecoverable error. Additionally unfortunate, for an inexperienced programmer, is the fact that the program terminates within the pseudo-assembly-language routine "qsort," included from a standard library and called from function member "printNames." The cause of premature termination may not be immediately obvious to the inexperienced programmer. As discussed above, the termination ultimately results from two programming errors in the implementation of function member "candidateNames." Had the programmer tested the pointer returned by the call to candidates[i].getName( ), on line 6, for equality with the value NULL, the programmer could catch the problem immediately. Instead, NULL pointers are added to the local array "nms," and then passed to the standard-library routine "qsort," which crashes attempting to dereference a NULL pointer.

The problem illustrated in this simple example can be straightforwardly debugged, but a similar problem within operating-system code, far below the level within a computer at which adequate debugging support is provided, can be difficult and time-consuming to find, the difficulty compounded by the code and time distances separating a failure to detect a distinguished value, such as a NULL pointer, returned by a function, and an attempt to use the distinguished value as the source or target of an instruction for which it is inappropriate. Correct programming practice obviates the need to debug such problems, but, as has been clearly demonstrated for the past 40 years, few programs are initially correctly written.

Another problem that commonly arises is that a programmer may check return values, but still inadvertently use certain return values inappropriately. For example, consider another attempt at writing the member function candidateNames:

```
1 int election::candidateNames(char** names)
2 {
3    int l = 0;
4    while (i < MAX_CANDIDATES)
5    {
6        names[i] = candidates[i].getName();
7        i++;
8        if (names[i] == NULL) break;
9    }
10   return i;
11 }
```

In this case, the programmer checked for a NULL return value, but only after incrementing i, and thus a NULL value still may be incorporated within the array of names, and cause qsort to fail, as with the previous version of candidateNames. Thus, programmers may improperly use error return values despite cursory checks for such values. Finally, note that, even if properly written, explicit checks for error values may be expensive. For example, in the above loop, an additional test is made during each loop iteration. In many cases, where error return values are infrequent, it would be desirable to forgo them altogether.

One Embodiment of the Present Invention

The machine support, described above, that supports control speculation can be used to automatically detect failure-to-detect-distinguished-value errors in programs. A NAT bit, or a similar 1-bit register associated with a floating-point register, can be set for a register, which returns a distinguished value from a function call. When the NAT bit is set, any non-speculative use of the register raises an exception, for which an appropriate exception handler can be written to allow a programmer to identify the offending use of the register with the associated NAT register set to the value "1." Two advantages accrue from using NAT bits to distinguish return values. First, any non-speculative use of the return value, even storing the return value in memory for future use, triggers an exception, so that the failure-to-check-for-distinguished-value is detected almost immediately, rather than many hundreds, thousands, or tens of thousands of instructions later. Second, the distinguished value can never inadvertently be employed successfully in a situation in which it is not intended to be used, leading even harder-to-debug errors. For example, consider a pointer with a distinguished value other than "0" returned from a function. Generally, the value is not a valid virtual-memory address, but, perhaps, quite accidentally, the value might reference a valid virtual-memory location. Should the pointer be used, without checking for the distinguished value, as the target of a store instruction, a valid memory location may be erroneously overwritten. Overwriting may, in turn, lead to a yet more serious error later in execution of the program, or even in execution of another program at a later time. Such problems are extremely difficult to diagnose and correct. By using the NAT-bit mechanism to flag distinguished values, failure-to-check-for-distinguished-value errors cannot lead to these serious, subsequent errors, since any non-speculative use of the NAT-bit-flagged register results in an exception.

In order to employ the NAT-bit mechanism to solve the above-described problem, the distinguished return value from the routine "getName" may be flagged as follows:

```
char* candidate::getName()
{
    if (nameLen > 0) return name;
    else
    {
        char* retVal = NULL;
        _asm
        {
            load.s retVal, [0]
        }
        return retVal;
    }
}
```

In the above, modified version of the routine "getName," a C++ assembly-language directive is used to attempt to speculatively load a value from the invalid virtual-memory address "0" into the register used for the return value. The load instruction results in a deferred exception, and setting of the corresponding NAT bit. Any subsequent non-speculative use of the return value will immediately raise a NAT-bit-set exception, identifying a failure to check for the distinguished value. Alternatively, if no use is made of the return value, then no exception is raised.

FIG. 5A shows the modified declaration for the class "candidate" and the modified, but conventional, implementation of the function member "getName." FIG. 5B shows a final declaration of the class "candidate" and a final implementation of the function member "getName" incorporating one embodiment of the present invention. FIGS. 5A–B thus contrast a standard approach to returning return values with one approach that incorporates one embodiment of the present invention.

When NAT bits are used to distinguish error return values, explicit checks may be avoided. For example, rather than test the return value from the C-programming-environment routine malloc each time malloc is called, malloc may be rewritten to set the NAT bit of the register containing the returned pointer value, so that, in the very rare case that malloc fails, the failure can be handled by an exception handling routine designed for that purpose.

Although the present invention has been described in terms of a particular embodiment, it is not intended that the invention be limited to this embodiment. Modifications within the spirit of the invention will be apparent to those skilled in the art. For example, many different methods and techniques may be used to set a NAT bit corresponding to a register containing a return value, depending on the machine architecture and programming language. The IA-64 architecture does not provide an instruction for directly setting a NAT bit, requiring a technique such as attempting to access an invalid virtual-memory address. Other machine architectures that support similar 1-bit register flags may provide such instructions, in which case the 1-bit flags may be directly set. Similarly, a program may test directly for a set NAT bit, using a special instruction, such as the tnat instruction in the IA-64 architecture, in order to test for a distinguished-value return, or may, alternatively, depend on the exception mechanism. Future machine architectures may incorporate a separate array of registers, in addition to registers used for flagging deferred exceptions incurred by control-speculative load operations, to support distinguished return values. Such registers may be 1-bit registers, or may be multi-bit registers that would allow encoding of a number of different distinguished values. In the above discussion, return values from C++ functions were discussed, but the present invention may be employed for machine support of distinguished values returned by routines in variable arguments, or values stored in registers by assembly-language routines or execution blocks.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

The invention claimed is:

1. A method for automated detection of a failure-to-check-a-return-value error in a computer program, the method comprising:
    identifying a machine-architecture feature that can flag a register to indicate a special state of the register so that a subsequent access of the register can be automatically detected by a processor;
    identifying a register in which a return value is stored for subsequent access; and
    when storing a distinguished value in the register as a return value, employing the machine-architecture feature to flag the register as containing the distinguished value.

2. The method of claim 1 wherein the machine-architecture feature comprises machine support for control speculation of load instructions.

3. The method of claim 2 wherein the machine support for control speculation of load instructions includes special registers associated with general registers.

4. The method of claim 3 wherein, when a special register is set, the special register indicates that a deferred exception has arisen during execution of a speculative load instruction for which the general register corresponding to the special register was specified as the target.

5. The method of claim 1 wherein the register in which a return value is stored may include:
   a register in which a function stores a return value;
   a register in which a function stores a new value for a variable supplied as a variable argument to the function;
   a register in which a routine stores a return value; and
   a register in which a routine stores a new value for a variable supplied as a variable argument to the function.

6. The method of claim 1 wherein a distinguished value further includes a value indicating an error condition or another special condition that should not be used for subsequent processing in the way that a non-error or non-special value is used.

7. The method of claim 6 wherein employing the machine-architecture feature to flag the register as containing the distinguished value further includes:
   using the register in a way to invoke setting of a special register that flags the register as being in a special state.

8. The method of claim 7 wherein the special register is a special register set to indicate deferral of an exception during processing of a control-speculative instruction.

9. Computer instructions that implement the method of claim 1 stored in a computer-readable medium, including:
   an electronic memory;
   a mass storage device; and
   a removable storage device.

10. A computer system that automatically detects a failure-to-check-a-return-value error in a computer program, the computer system comprising:
    a processor that includes a machine-architecture feature that can flag a register to indicate a special state of the register so that a subsequent access of the register can be automatically detected by the processor;
    a register in which a return value is stored for subsequent access; and
    a stored program that includes a called, executable block of instructions that, when storing a distinguished value in the register as a return value, direct the machine-architecture feature to flag the register as containing the distinguished value.

11. The system of claim 10 wherein the machine-architecture feature comprises machine support for control speculation of load instructions.

12. The system of claim 11 wherein the machine support for control speculation of load instructions includes special registers associated with general registers.

13. The system of claim 12 wherein, when a special register is set, the special register indicates that a deferred exception has arisen during execution of a speculative load instruction for which the general register corresponding to the special register was specified as the target.

14. The system of claim 13 wherein the register in which a return value is stored may include:
    a register in which a function stores a return value;
    a register in which a function stores a new value for a variable supplied as a variable argument to the function;
    a register in which a routine stores a return value; and
    a register in which a routine stores a new value for a variable supplied as a variable argument to the function.

15. The system of claim 10 wherein a distinguished value further includes a value indicating an error condition or another special condition that should not be used for subsequent processing in the way that a non-error or non-special value is used.

16. The system of claim 15 wherein directing the machine-architecture feature to flag the register as containing the distinguished value further includes:
    using the register in a way to invoke setting, by the processor, of a special register that flags the register as being in a special state.

17. The method of claim 16 wherein the special register is a special register set to indicate deferral of an exception during processing of a control-speculative instruction.

* * * * *

UNITED STATES PATENT AND TRADEMARK OFFICE
CERTIFICATE OF CORRECTION

| | | |
|---|---|---|
| PATENT NO. | : 7,051,238 B2 | Page 1 of 1 |
| APPLICATION NO. | : 10/209101 | |
| DATED | : May 23, 2006 | |
| INVENTOR(S) | : Robert D. Gardner et al. | |

It is certified that error appears in the above-identified patent and that said Letters Patent is hereby corrected as shown below:

In column 7, line 59, delete "modem" and insert -- modern --, therefor.

In column 9, line 46, after "a" delete "chks" and insert -- chk.s --, therefor.

In column 9, line 46, after "The" delete "chks" and insert -- chk.s --, therefor.

In column 16, line 49, after "contemplated." insert -- It is intended that the scope of the invention be defined by the following claims and their equivalents: --.

Signed and Sealed this

Seventh Day of April, 2009

JOHN DOLL
*Acting Director of the United States Patent and Trademark Office*